US006934447B2

(12) United States Patent
Kim

(10) Patent No.: US 6,934,447 B2
(45) Date of Patent: Aug. 23, 2005

(54) Y-BRANCHED OPTICAL WAVEGUIDE AND MULTI-STAGE OPTICAL POWER SPLITTER USING THE SAME

(75) Inventor: Heu-Gon Kim, Seoul (KR)

(73) Assignee: Samsung Electronics, Co. Ltd., Suwon-si (KR)

( * ) Notice: Subject to any disclaimer, the term of this patent is extended or adjusted under 35 U.S.C. 154(b) by 176 days.

(21) Appl. No.: 10/071,388

(22) Filed: Feb. 8, 2002

(65) Prior Publication Data

US 2003/0016914 A1 Jan. 23, 2003

(30) Foreign Application Priority Data

Jul. 23, 2001 (KR) ........................................ 2001-44094

(51) Int. Cl.[7] .................................................. G02B 6/26
(52) U.S. Cl. ........................................... 385/45; 385/43
(58) Field of Search ...................................... 385/43, 45

(56) References Cited

U.S. PATENT DOCUMENTS 5,586,209 A * 12/1996 Matsuura et al. ............. 385/45

OTHER PUBLICATIONS

Uetsuka et al., "Novel Asymmetric Y–Branches for Planar Lightwave Circuits", 1996, OFC '96 Technical Digest, pp. 176–177.*

* cited by examiner

*Primary Examiner*—Akm Enayet Ullah
*Assistant Examiner*—Michelle R. Connelly-Cushwa
(74) *Attorney, Agent, or Firm*—Cha & Reiter, L.L.C.

(57) ABSTRACT

A Y-branched optical waveguide with a uniform output characteristic for use in optical communication systems is disclosed. The optical waveguide, consisting of a core section serving as a transmission medium of an optical signal and a cladding section surrounding the core section, is formed on a semiconductor substrate. An input-tapered waveguide is configured to receive the optical signal through a first ending section and to output the optical signal through a second ending section, with a symmetrical structure with respect to a centered line of the input-tapered waveguide, so that a width of the input-tapered waveguide extends more widely along the centered line. A pair of first and second output-tapered waveguides each are configured to receive the optical signal branched through the second ending section, from which the pair of first and second output-tapered waveguides respectively extend downstream, with an asymmetrical structure with respect to the centered line, a respective width of the first and second output-tapered waveguides extending more widely along the centered line.

17 Claims, 24 Drawing Sheets

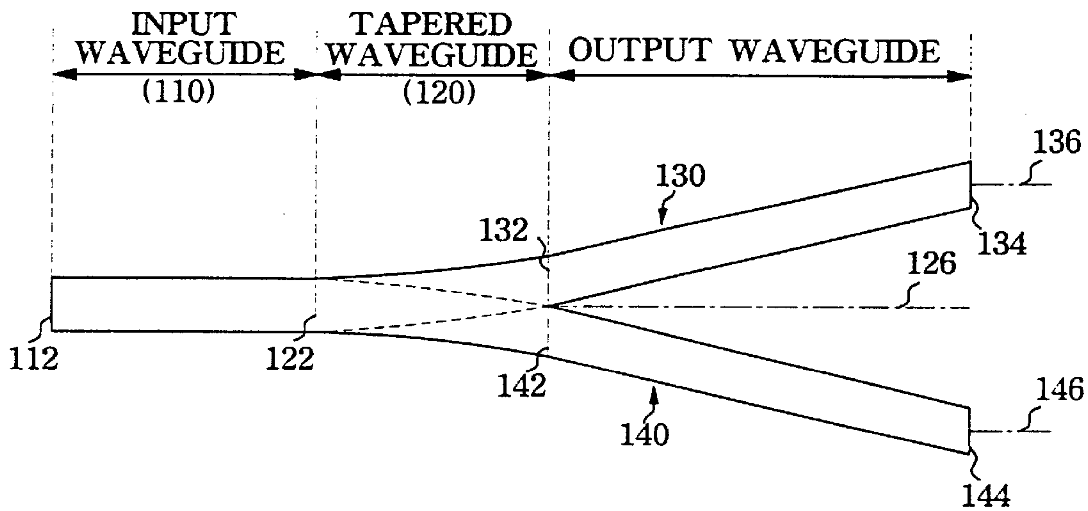
FIG.1 [PRIOR ART]

FIG.2 [PRIOR ART]
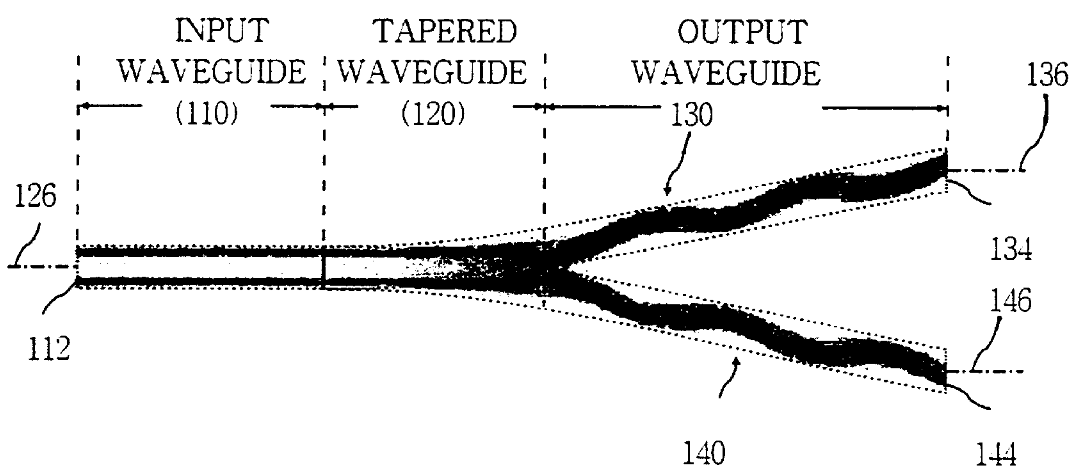

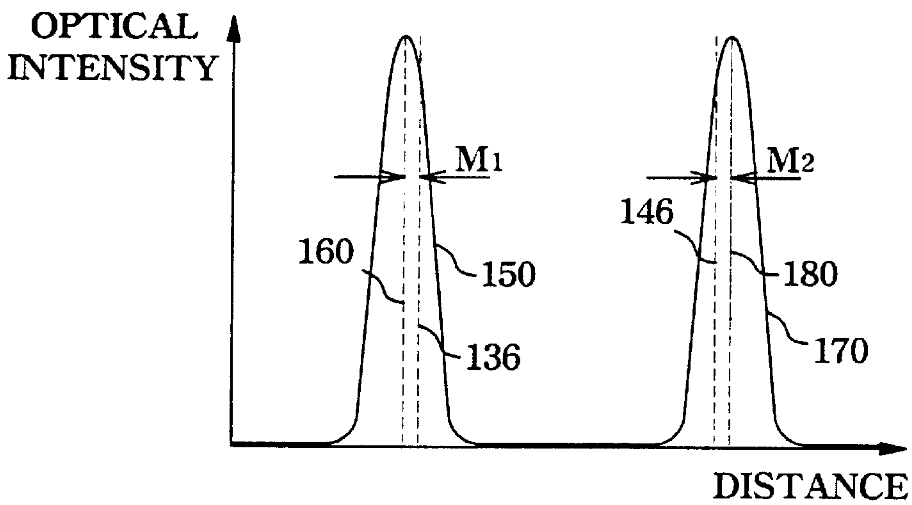
FIG.3 [PRIOR ART]

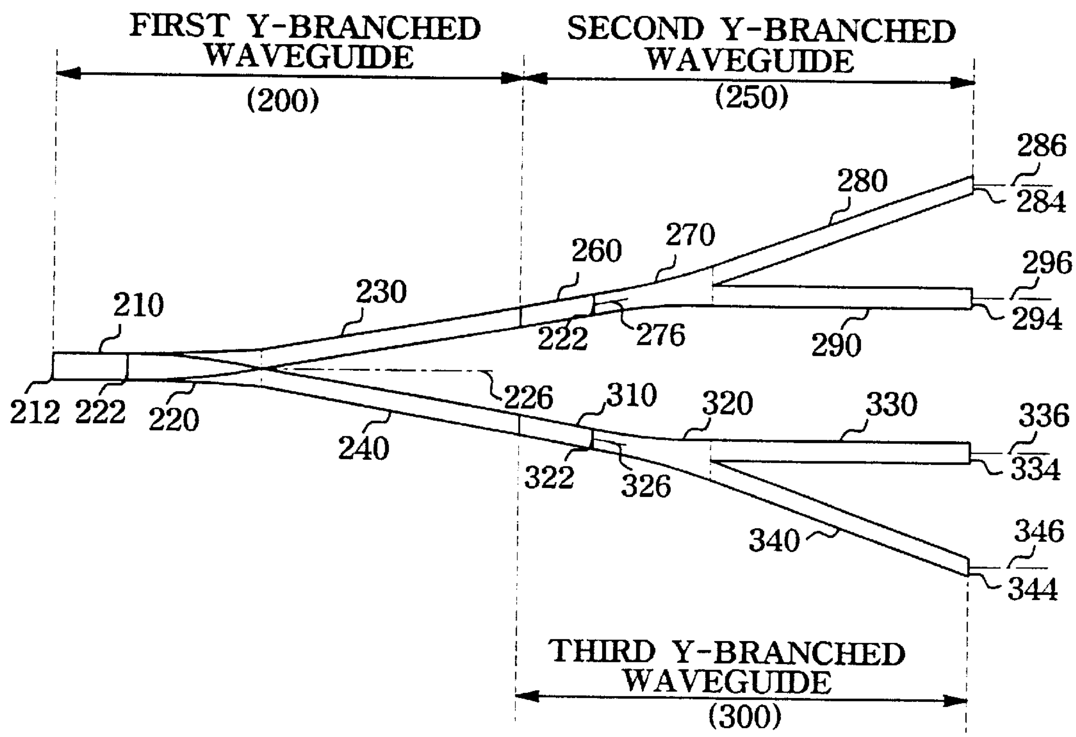
FIG.4 [PRIOR ART]

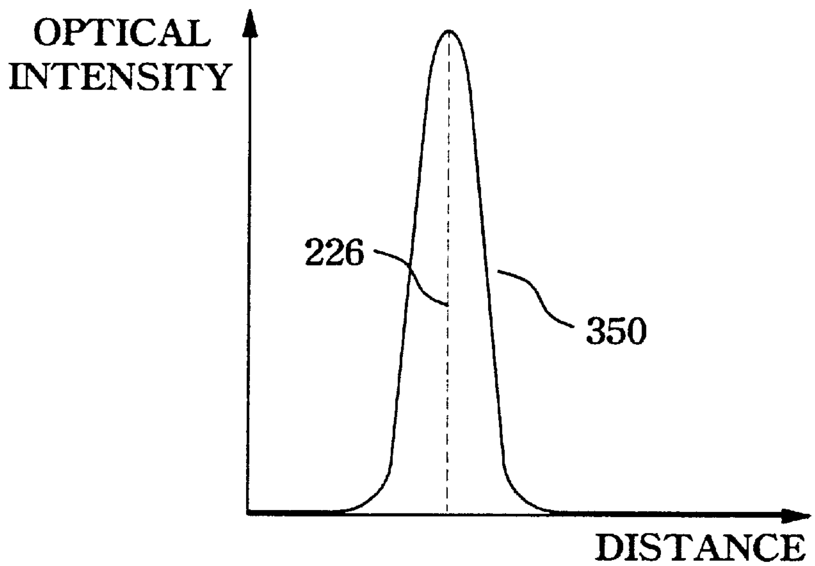
FIG.5A [PRIOR ART]

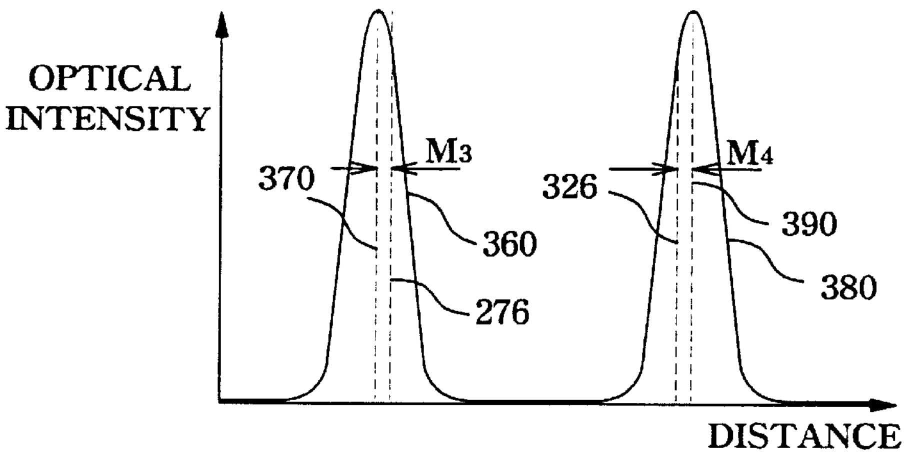
FIG.5B [PRIOR ART]

FIG.6 [PRIOR ART]
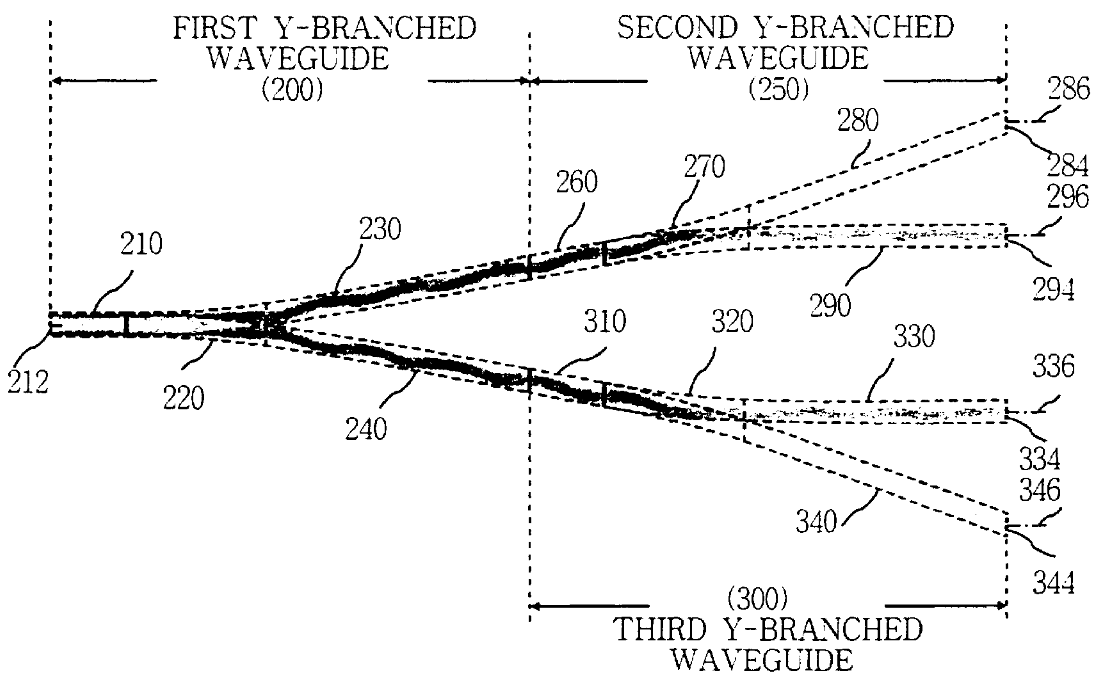

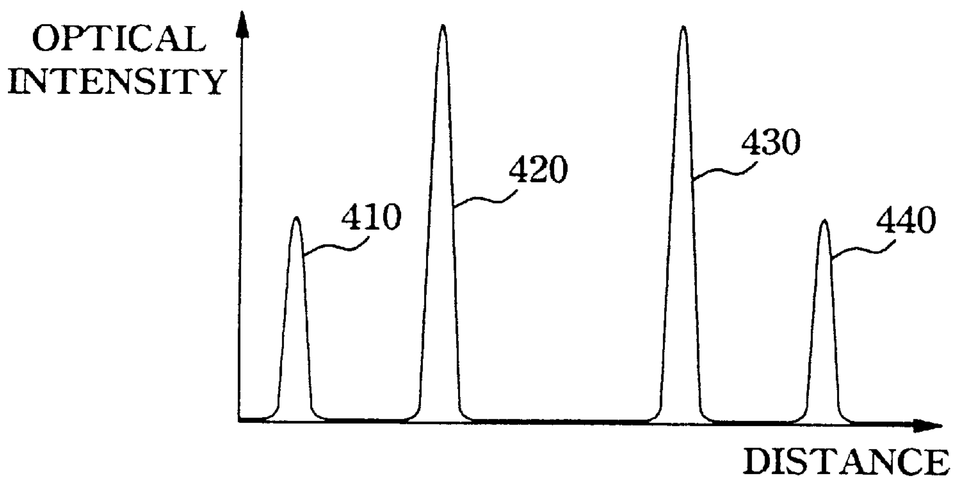
FIG.7 [PRIOR ART]

Y-BRANCHED OPTICAL WAVEGUIDE AND MULTI-STAGE OPTICAL POWER SPLITTER USING THE SAME

CLAIM OF PRIORITY

This application makes reference to and claims all the benefits accruing under 35 U.S.C. Section 119 from an application entitled "Y-Branched Optical Waveguide And Multi-Stage Optical Power Splitter Using The Same" filed in the Korean Industrial Property Office on Jul. 23, 2001 and there duly assigned Serial No. 2001-44094.

BACKGROUND OF THE INVENTION

1. Field of the Invention

The present invention relates generally to an optical power splitter for use in optical communication systems, and, in particular, to an improved structure of a Y-branched optical waveguide and a multi-stage optical power splitter using the same.

2. Description of the Related Art

Optical communication systems are fast-growing areas in communication networks. The "optical communication system" pertains to any system that uses optical signals to convey information across an optical waveguiding medium, such as an optical fiber. An optical waveguide generally consists of a core section configured to propagate an optical carrier signal within the core, and a cladding section surrounding the entire periphery of the core section. Optical elements employing such an optical waveguide include, i.e., an optical power splitter/coupler for splitting or coupling the optical power of the optical signals, and a wavelength division multiplexer/demultiplexer for multiplexing or demultiplexing multiple channels of the optical signal according to the wavelengths selected. A Y-branched optical waveguide is typically used for splitting optical power, and includes an input waveguide for receiving the optical signal, a tapered waveguide for extending the transfer mode of the input optical signal, and a pair of output waveguides for branching out the optical power of the extended optical signal to provide the branched optical power as an output optical signal.

FIG. 1 is a schematic diagram showing a prior art, Y-branched optical waveguide, which includes a substantially straight input waveguide 110 for receiving the optical signal through a first end section 112; a tapered waveguide 120, the width of which increases along the direction of the propagation of the optical signal for receiving the optical signal through a second end section 122 that is coupled with the input waveguide 110; and, a first and a second output waveguide 130 and 140, respectively, extending from third end sections 132 and 142 outwardly, being symmetrical to each other with respect to a center line 126 of the tapered waveguide 120. The Y-branched optical waveguide may be a planar lightguide circuit (PLC) device formed of multiple layers of a high refractive index of the core section and a low refractive index of the cladding section surrounding the core section on a substrate.

FIG. 2 is a schematic diagram illustrating the waveguiding mode of the optical signal propagating in the Y-branched optical waveguiding medium shown in FIG. 1. As shown in FIG. 2, it can be observed that the split optical signals propagate unstably along the length of the first and second output waveguides 130 and 140, respectively. FIG. 3 is a graphic diagram exhibiting the mode profile of the split optical signals in the third end sections 134 and 144 of the first and second output waveguides 130 and 140. In particular, the first and second mode profiles 150 and 170 of the split optical signals indicate what appears in the third end sections 132 and 142 of the first and second output waveguide 130 and 140, respectively. Note that the respective centering lines 160 and 180 of the first and second mode profiles 150 and 170 deviate by a given distance M1 or M2 from the respective center lines 136 and 146 of the first and second output waveguides 130 and 140, thereby exhibiting the mode misalignment. Here, as the optical signal is perpendicularly incident upon the first end section 112 of the input waveguide 110 while the first and second output waveguides 130 and 140 are arranged symmetrically to each other with respect to the center line 126, the amounts M1 and M2 of the above-mentioned mode misalignment are identical to each other. Therefore, this mode misalignment makes the output characteristic of the Y-branched waveguide unstable. As such, the connection of the Y-branched waveguide to other optical waveguiding elements or a subsequent stage of the Y-branched waveguide will influence the output characteristic of the corresponding Y-branched waveguide disadvantageously.

FIG. 4 shows a schematic diagram of the structure of a two-stage optical power splitter using the prior art Y-branched waveguide. FIGS. 5*a* and 5*b* each shows a graphic diagram of the respective mode profiles of the optical signals propagating through the two-stage stage optical power splitter. As shown in FIG. 4, the two-stage optical power splitter includes a first Y-branched waveguide 200 having a first input waveguide 210, a first tapered waveguide 220, and a first and a second output waveguides 230 and 240; a second Y-branched waveguide 250 having a second input waveguide 260, a second tapered waveguide 270, and a third and a fourth output waveguides 280 and 290; and, a third Y-branched waveguide 300 having a third input waveguide 310, a first tapered waveguide 320, and a fifth and a sixth output waveguides 330 and 340.

FIG. 5*a* shows the mode profile 350 of the optical signal appearing in the first end section 222 of the first tapered waveguide 220, in which the input optical signal is perpendicularly incident upon the first end section 212 of the first input waveguide 210. Thus, the alignment between the center mode of the mode profile 350 and a first center line 226 of the first tapered waveguide 220 is achieved. FIG. 5*b* shows the mode profiles 360 and 380 of the first-branched optical signals appearing in the first end sections 222 and 322 of the second and third tapered waveguides 270 and 320, respectively. The mode centers 370 and 390 of the mode profiles 360 and 380 are arranged to deviate by a fixed distance M3 or M4 respectively from the first and second center lines 276 and 326, thereby exhibiting the mode misalignment.

As the two-stage optical power splitter has a symmetrical structure with respect to the first center line 226, the mode profiles of the second-branched optical signals appearing in the second end sections 284, 294, 334, and 344 of the third to sixth output waveguides 280, 290, 330, and 340 are formed in symmetry with respect to the first center line 226.

FIG. 6 schematically shows the waveguiding mode of the optical signal propagating through the two-stage optical power splitter. As shown in FIG. 6, it is noted that the first-branched optical signal unstably propagates along the longitudinal direction of the first and second output waveguides 230 and 240, and in a similar way, the second-branched optical signal propagates even more unstably along the longitudinal direction of the third to the sixth output waveguides 280, 290, 330, and 340.

FIG. 7 shows a graphic diagram of the first to the fourth mode profiles 410, 420, 430, and 440 of the second-branched optical signals appearing in the second end sections 284, 294, 334, and 344 of the third to the sixth output waveguides 280, 290, 330, and 340, respectively. Note that the optical intensity in the center of the second and third mode profiles 420 and 430 of the first to the fourth mode profiles 410, 420, 430, and 440 is much higher than that in the center of the first and the fourth mode profiles 410 and 440. That is to say, the input optical signal has been subject to a first modal misalignment passing through the first stage of the two-stage optical power splitter and then a second modal misalignment passing through the second stage of the two-stage optical power splitter. Thus, it is also noted that the first to the fourth mode profiles 410, 420, 430, and 440 represent the result of those two successive modal misalignments overlapped.

As appreciated from the foregoing, the prior art, Y-branched optical waveguide of FIG. 1 has some disadvantages in that it generates undesirably uneven output characteristic as the input optical signal propagating thereof has the modal misalignment in the interim. Furthermore, the multi-stage optical power splitter using the prior art, Y-branched optical waveguide as shown in FIG. 4 may also have the same problem in that it will be undesirably subject to the generation of such uneven output characteristic because the input optical signal passing through the optical power splitter will be effected by the successive modal misalignment caused by a multiplicity of Y-branched optical waveguides.

SUMMARY OF THE INVENTION

It is, therefore, an object of the present invention to provide a Y-branched optical waveguide with a uniform output characteristic for use in optical communication systems.

It is another object of the present invention to provide a multi-stage optical power splitter with a uniform output characteristic suitable for use in the optical communication systems.

To achieve the above and other objects of the invention, according to one aspect of the present invention, a Y-branched optical waveguide with a core section serving as a transmission medium of an optical signal and a cladding section surrounding the core section, being formed on a semiconductor substrate, includes an input-tapered waveguide configured to receive the optical signal through a first ending section and to output the optical signal through a second ending section, having a symmetrical structure with respect to a centered line of the input-tapered waveguide, a width of the input-tapered waveguide gradually extending more widely along the centered line; and, a pair of first and second output-tapered waveguides each configured to receive the optical signal branched through the second ending section, from which the pair of first and second output-tapered waveguides respectively extend downstream, with an asymmetrical structure with respect to the centered line, a respective width of the first and second output-tapered waveguides gradually extending more widely along the centered line.

Preferably, the entrances of the first and second output-tapered waveguides are arranged in the second ending section in such a way that their inner edges are spaced apart from each other by a first specified width of gap stopped with a part of the second ending section.

Preferably, the entrances of the first and second output-tapered waveguides are arranged in the second ending section, in such a way that their respective outer edges are spaced apart from a respective upper or lower edge of the outer surfaces of the input-tapered waveguide, respectively by a second or third specified width of gaps different from each other.

More preferably, the first and second output-tapered waveguides are respectively formed in an arc with a specified curvature.

BRIEF DESCRIPTION OF THE DRAWINGS

The above and other objects, features, and advantages of the present invention will become more apparent from the following detailed description when taken in conjunction with the accompanying drawings in which:

FIG. 1 is a schematic diagram of a prior art, Y-branched optical waveguide;

FIG. 2 is a schematic diagram showing the waveguiding mode of an optical signal propagating through the Y-branched optical waveguide of FIG. 1;

FIG. 3 is a graphic diagram illustrating the mode profiles of the branched optical signals appearing in the respective second end sections of the first and second output waveguides;

FIG. 4 is a schematic diagram showing the structure of a two-stage optical power splitter using the prior art, Y-branched optical waveguide;

FIGS. 5*a* and 5*b* are graphic diagrams illustrating the mode profiles of the split optical signals propagating through the two-stage optical power splitter according to FIG. 4;

FIG. 6 is a schematic diagram showing the waveguiding mode of the optical signals propagating through the two-stage optical power splitter of FIG. 4;

FIG. 7 is a graphic diagram illustrating the first to the fourth mode profiles of the second branched optical signals appearing in the second end sections of the third to the sixth output waveguides;

DETAILED DESCRIPTION OF THE PREFERRED EMBODIMENT

A preferred embodiment of the present invention will be described herein below with reference to the accompanying drawings. For the purposes of simplicity and clarity, well-known functions or constructions are not described in detail as they would obscure the invention in unnecessary detail.

Figure 8:
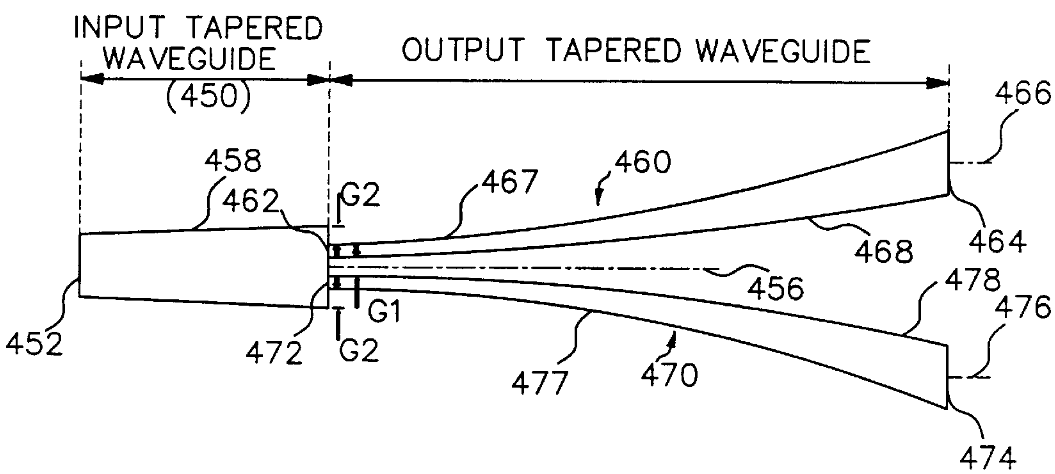
FIG. 8 is a schematic diagram showing the structure of the Y-branched optical waveguide according to a preferred embodiment of the present invention.

Referring to FIG. 8, a description will be made relating to the structure of a Y-branched optical waveguide according to a preferred embodiment of the present invention. As shown in FIG. 8, the Y-branched optical waveguide is provided with an input-tapered waveguide 450, a first output-tapered waveguide 460, and a second output-tapered waveguide 470. The input-tapered waveguide 450 is configured to receive an input optical signal through a first end section 452 and supply the optical signal branched through its other end sections. The input-tapered waveguide 450 is also configured to have its width spreading out more widely as the optical signal propagates further into the input waveguide, with its outer surface formed in an S-shaped structure. Each of the first and second output-tapered waveguides 460 and 470 is configured to receive the branched optical signals at the first end sections 462 and 472 that are coupled the other end section of the input-tapered waveguide 450. Both tapered waveguides 460 and 470 have their respective outer surface formed in an arc at specified curvatures and configured to have their widths spreading out more widely as the optical signals propagate therethrough. The two receiving ends of the inner surfaces 468 and 478 of the first and second output-tapered waveguides 460 and 470 are spaced apart from each other by a specified gap G1, while the two receiving ends of the outer surfaces 467 and 477 of the first and second output-tapered waveguides 460 and 470 are spaced apart from the respective outer surfaces 458 of the input waveguide 450 by another specified gap G2. Furthermore, the first and second output-tapered waveguides 460 and 470 are disposed in symmetry with respect to a centered line 456 of the input waveguide 450.

Figure 9:
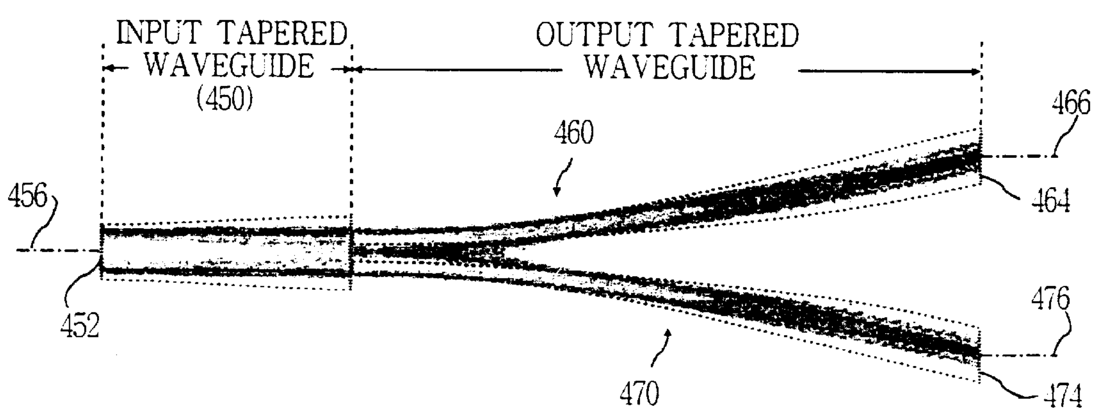
FIG. 9 is a schematic diagram illustrating the waveguiding mode of the optical signals propagating through the Y-branched optical waveguide of FIG. 8.
Figure 10:
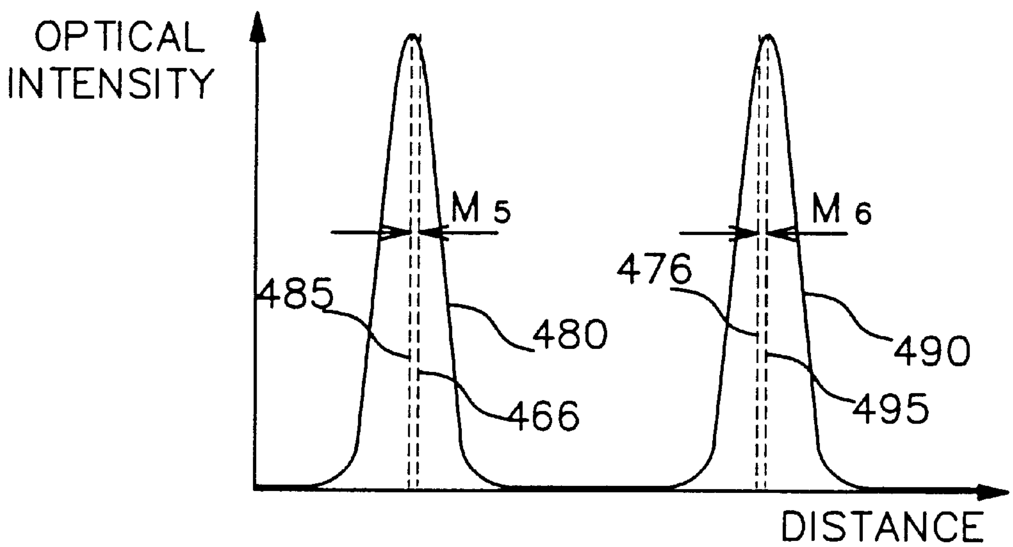
FIG. 10 is a graphic diagram illustrating the mode profiles of the split optical signals appearing in the second end sections of the first and second tapered output waveguides of FIG. 8.

FIG. 9 shows the waveguiding mode of the optical signals propagating through the Y-branched optical waveguide of FIG. 8 during simulation. FIG. 10 shows the mode profiles of the branched optical signals appearing in the second end sections 464 and 474 of the first and second tapered output waveguides 460 and 470 shown in FIG. 8. As shown in the waveguiding modes of the branched optical signals, note that the optical signals propagate in a relatively stable manner along the longitudinal direction of the first and second output-tapered waveguides 460 and 470 when the input optical signal is incident on the first end section 452 of the input waveguide 450.

Referring to FIG. 10, the first and second mode profiles 480 and 490 of the branched optical signals appearing in the second end sections 464 and 474 of the first and second tapered output waveguides 460 and 470 are shown respectively. As shown in FIG. 10, the respective centered lines 485 and 495 of the first and second mode profiles 480 and 490 are respectively spaced apart by a specified interval M5 or M6 from the centered lines 466 and 476 of the first and second tapered output waveguides 460 and 470, thereby resulting in the modal misalignment. Here, as the input optical signal is perpendicularly incident on the first end section 452 of the input waveguide 450 while the first and second output-tapered waveguides 460 and 470 are disposed in symmetry to the centered line 456 of the input waveguide 450, those intervals M5 and M6 in modal misalignment are the same to each other. Although such modal misalignment often makes the output characteristic of the Y-branched optical waveguide uneven, it should be appreciated that the extent of such unevenness in the modal misalignment in the case where the Y-branched optical waveguide is structured as shown in FIG. 9 may be negligible when compared to the prior art structure of FIG. 1.

Figure 11:
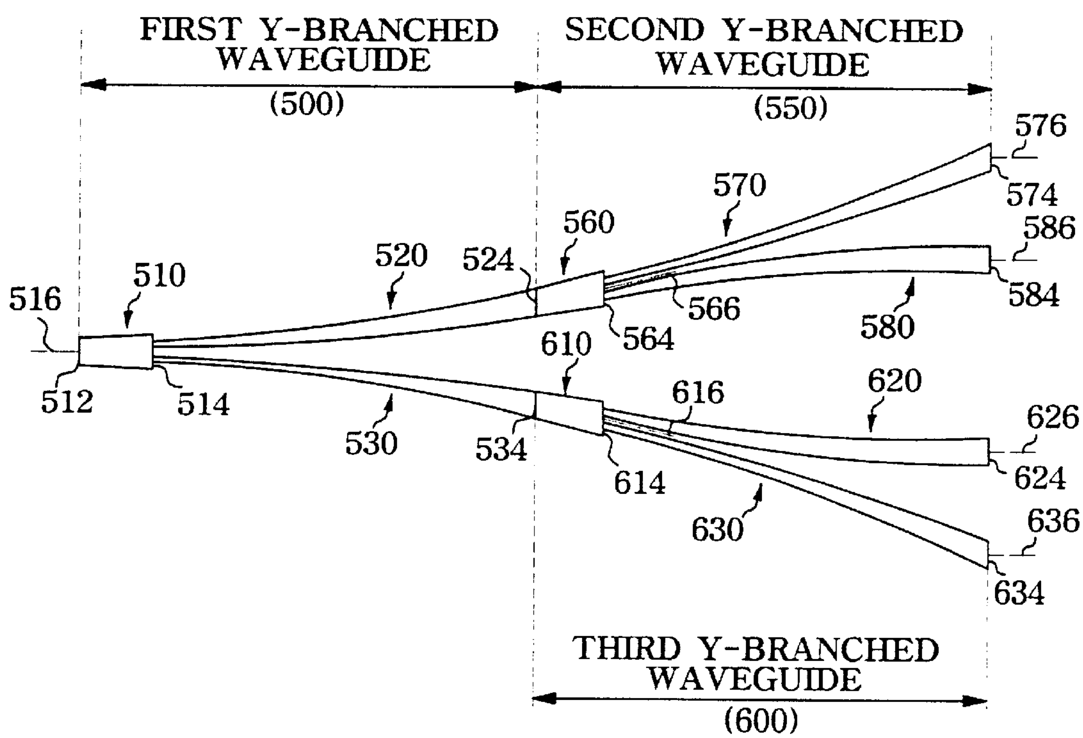
FIG. 11 is a schematic diagram showing the structure of a two-stage optical power splitter having the Y-branched optical waveguide of FIG. 8 according to a preferred embodiment of the present invention.
Figure 12A:
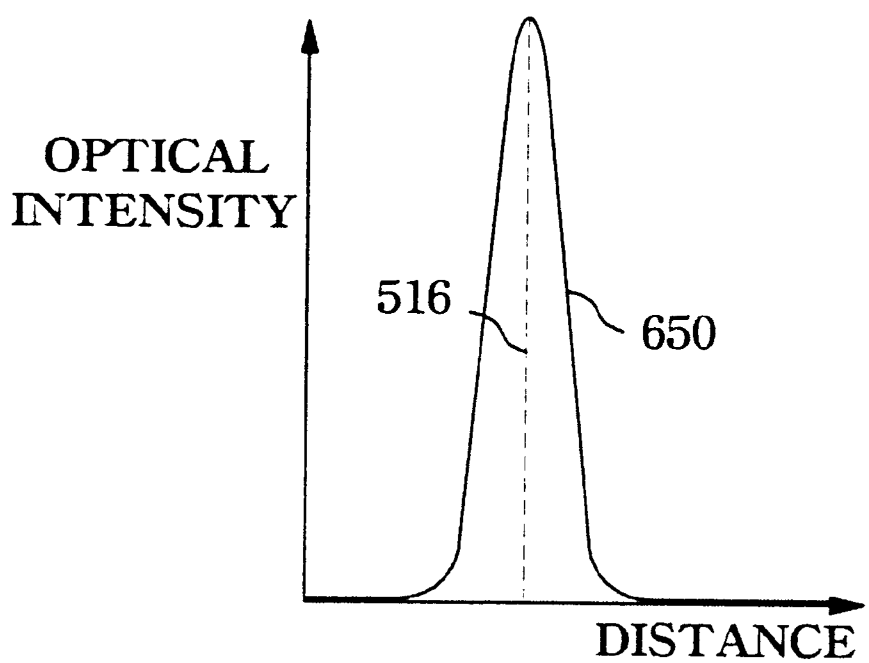
FIGS. 12*a* and 12*b* are graphic diagrams illustrating the mode profiles of the optical signals propagating through the two-stage optical power splitter of FIG. 11.
Figure 12B:
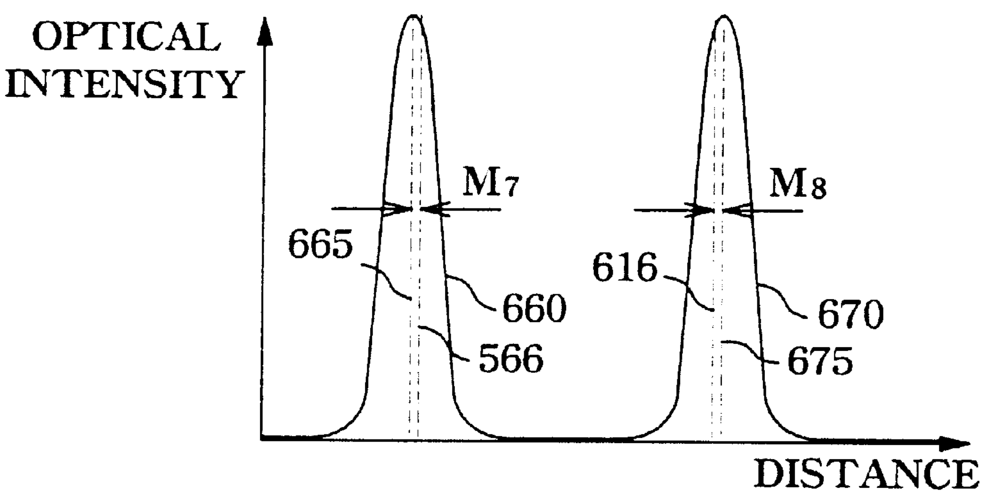

FIG. 11 schematically shows the structure of a two-stage optical power splitter utilizing the Y-branched optical waveguide of FIG. 8 according to another preferred embodiment of the present invention. FIGS. 12*a* and 12*b* each shows the mode profiles of the optical signals propagating through the two-stage optical power splitter. As shown in FIG. 11, the two-stage optical power splitter includes a first Y-branched optical waveguide 500, which constructs a first stage of the two-stage optical power splitter, having a first input-tapered waveguide 510,a first output-tapered waveguide 520, and a second output-tapered waveguide 530. The two-stage optical power splitter further includes a second Y-branched optical waveguide 550, which constructs a second stage of the two-stage optical power splitter, having a second input-tapered waveguide 560 coupled to a third and a fourth output-tapered waveguides 570 and 580 respectively, and a third Y-branched optical waveguide 600 having a third input-tapered waveguide 610 coupled to a fifth output-tapered waveguide 620 and a sixth output-tapered waveguide 630, respectively.

Referring now to FIG. 12*a*, note that the mode profile 650 of the optical signals appearing in the second end section 514 of the first input-tapered waveguide 510. Here, the arrangement is made in such a way that the input optical signal is perpendicularly incident to the first end section 512 of the first input waveguide 510, thus the center of the mode profile 650 coincides with a first centered line 516 of the input waveguide 510.

Referring then to FIG. 12*b*, note that the mode profiles 660 and 670 of the first branched optical signals appearing in the second end section 564 and 614 of the second and third input-tapered waveguides 560 and 610. As illustrated, note that the center lines 665 and 675 of the mode profiles 660 and 670 are spaced apart, by a specified gap M7 or M8, from the second and third center lines 566 and 616 of the input waveguide 510, thereby resulting in the modal misalignment. As the two-stage optical power splitter has a symmetrical structure with respect to the first center line 516, the mode profiles of the second branched optical signals appearing in the second end section 578, 584, 624, and 634 of the third to the sixth output-tapered waveguides 570, 580, 620, and 630 are respectively formed symmetrically with respect to the first center line 516.

Figure 13:
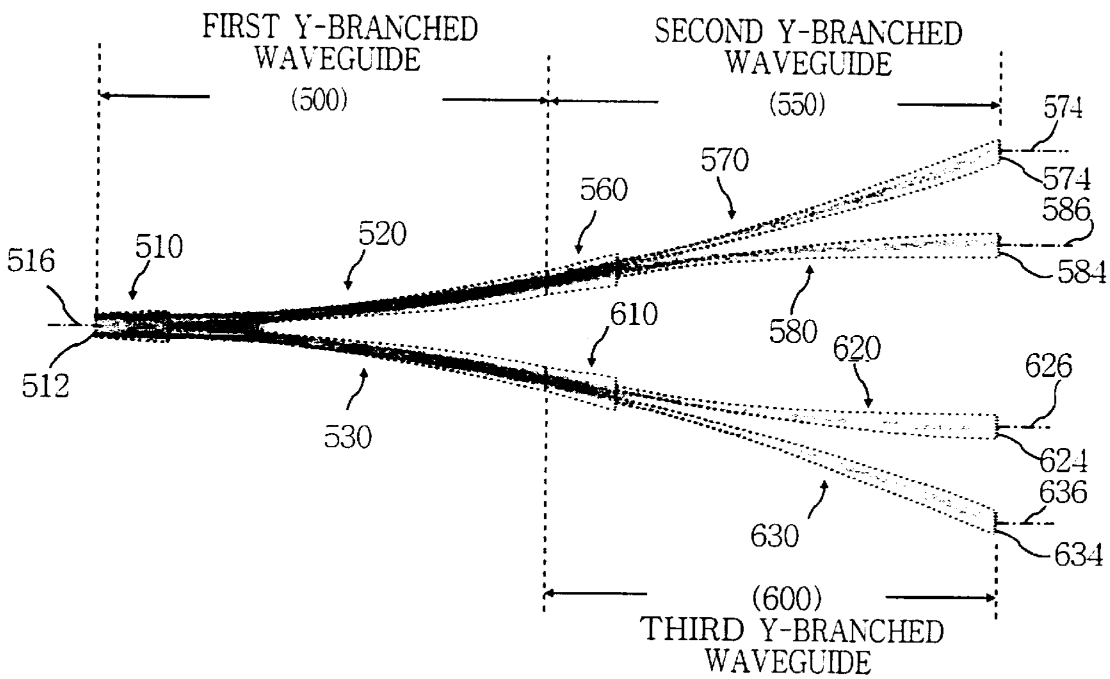
FIG. 13 is a schematic diagram illustrating the waveguiding mode of the optical signals propagating through the two-stage optical power splitter according to FIG. 11.

FIG. 13 schematically shows the waveguiding mode of the optical signals propagating through the two-stage optical power splitter shown in FIG. 11. Referring to the waveguiding mode of the branched optical signals, note that the first branched optical signals propagate through the first and second output waveguides 520 and 530 along their longitudinal directions in a relatively stable manner, while the second branched optical signals propagate through the third to the sixth output waveguides 570, 580, 620, and 630 along their longitudinal directions in a relatively unstable manner.

Figure 14:
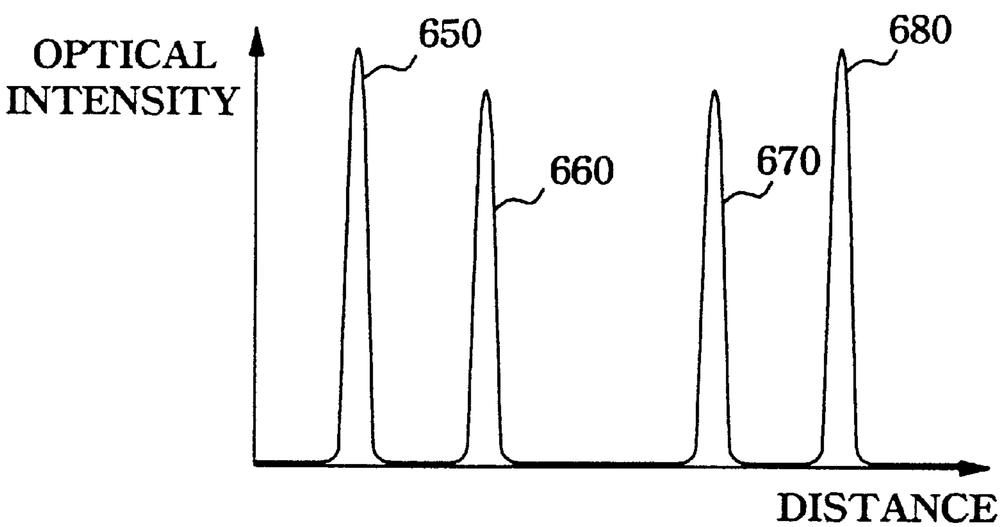
FIG. 14 is a graphic diagram illustrating the first to the fourth mode profiles of the second-branched optical signals appearing in the second end sections of the third to the sixth tapered output waveguides.

Referring to FIG. 14, note that the first to the fourth mode profiles 650, 660, 670, and 680 of the second-branched optical signals appearing in the second end sections 574, 584, 624, and 634 of the third to the sixth output-tapered waveguides 570, 580, 620, and 630. As illustrated, note that the peak intensity in the second and third mode profiles 660 and 670 of the above first to the fourth mode profiles 650, 660, 670, and 680 is formed slightly lower than that in the first and the fifth mode profiles 650 and 680. Thus, it will be appreciated by those skilled in the art that the input optical signal will be subject to a first modal misalignment passing through the first stage of the two-stage optical power splitter and then a second misalignment that is a similar modal misalignment passing through the second stage of the two-stage optical power splitter. Although such modal misalignment often makes the output characteristic of the Y-branched optical waveguide uneven, it should be appreciated that the extent of such unevenness in the modal misalignment in the case where the Y-branched optical waveguide is structured as shown in FIG. 11 may be negligible when compared to the prior art structure of FIG. 1.

Figure 15:
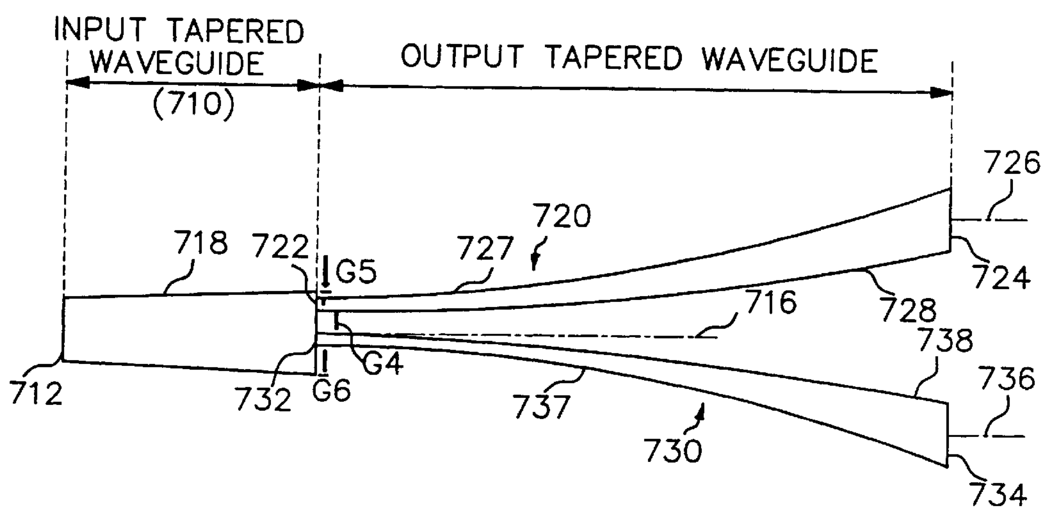
FIG. 15 is a schematic diagram showing the structure of the Y-branched optical waveguide according to a preferred embodiment of the present invention.

FIG. 15 will make a description relating to the structure of the Y-branched optical waveguide according to another preferred embodiment of the present invention. As shown in FIG. 15, the Y-branched optical waveguide is provided with an input-tapered waveguide 710 and a first and a second output-tapered waveguides 720 and 730. The input-tapered waveguide 710 is configured to receive the input optical signal through its first end section 712 and supply the optical signal branched through its second end sections. The input-tapered waveguide 710 is also configured to have its width spreading out more widely as the optical signal propagates therethrough. The first and second output tapered waveguides 720 and 730 are each configured to receive the branched optical signals at the first end sections 722 and 732 coupled with the second end section of the input-tapered waveguide 710, and have their respective outer surface formed in an arc with a specified curvature. The first and second output-tapered waveguides 460 and 470 each are also configured to have their widths spreading out more widely as the optical signals propagate therethrough in a similar way as the above. The two inputting edges of the inner surfaces 728 and 738 of the first and second output-tapered waveguides 720 and 730 are spaced apart from each other by a specified gap G4, while the other two inputting edges of the outer surfaces 727 and 737 of the first and second output-tapered waveguides are spaced apart from the respective outer surfaces 718, i.e., either an upper edge or a lower edge, of the input waveguide 710 by another specified gap G5. Here, the gap G6 is arranged preferably to be larger than the gap G5, in such a way that the value of (G5+offset) is substantially equal to, or very similar to, the value of (G6−offset).

Figure 16:
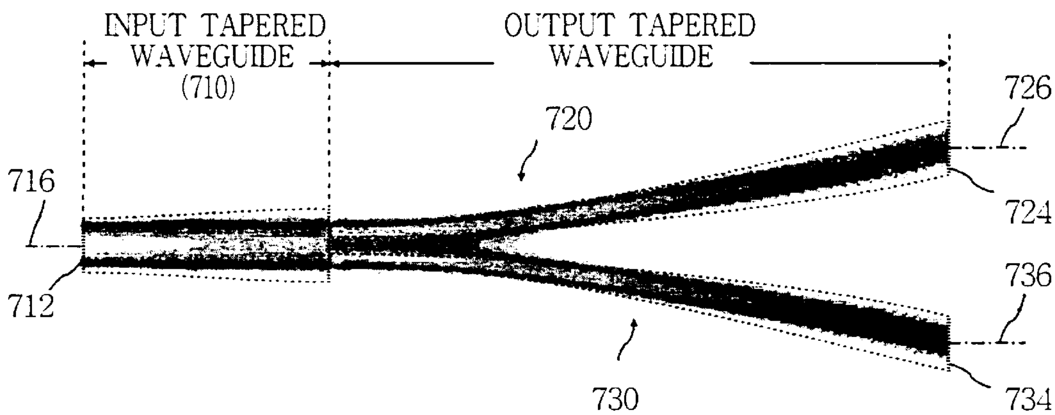
FIG. 16 is a schematic diagram illustrating the waveguiding mode of the optical signals propagating through the Y-branched optical waveguide according to FIG. 15.
Figure 17:
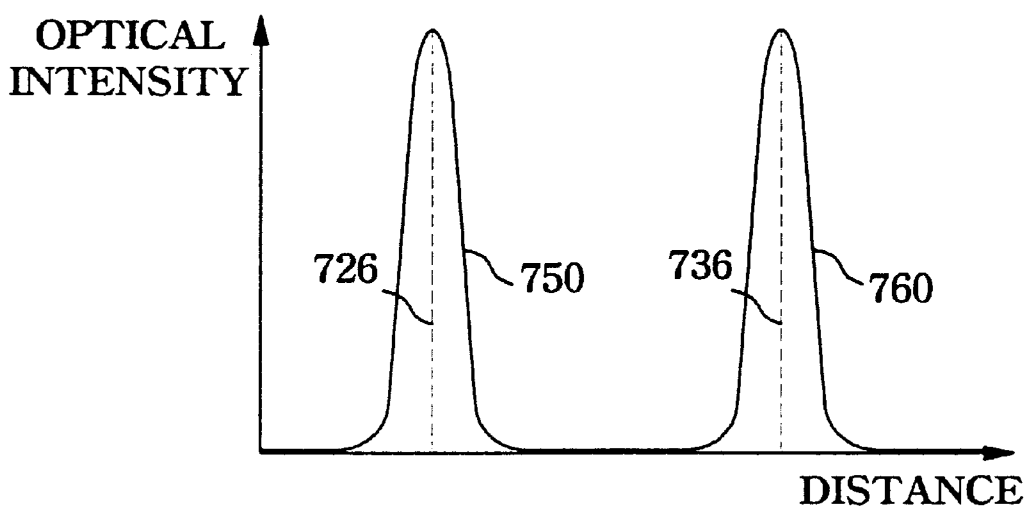
FIG. 17 is a graphic diagram illustrating the first and second mode profiles of the split optical signals appearing in the second end sections of the first and second tapered output waveguides according to FIG. 15.

FIG. 16 schematically shows the waveguiding mode of the optical signals propagating through the Y-branched optical waveguide according to FIG. 15. FIG. 17 shows the mode profiles of the split optical signals appearing in the second end sections 724 and 734 of the first and second tapered output waveguides 720 and 730. As seen in the waveguiding mode of the branched optical signals, it is noted that the optical signals propagate in a relatively stable manner along the longitudinal direction of the first and second output-tapered waveguides, wherein the input optical signal is perpendicularly incident to the first end section 712 of the input-tapered waveguide 710.

FIG. 17 shows the first and second mode profiles 750 and 760 of the branched optical signals appearing in the second end sections 724 and 734 of the first and second tapered output waveguides 720 and 730, respectively. As illustrated, it is noted that the respective centered lines 726 and 736 of the first and second mode profiles 750 and 760 respectively coincide with the respective centered lines 726 and 736 of the first and second tapered output waveguides 720 and 730. Here, the offset value should be set, for example, so as to compensate the interval M7 or M8 in modal misalignment, in case where all the physical conditions of this Y-branched optical waveguide are adapted to be identical to those of the other Y-branched optical waveguide of FIG. 8, except for the offset condition only.

Figure 18:
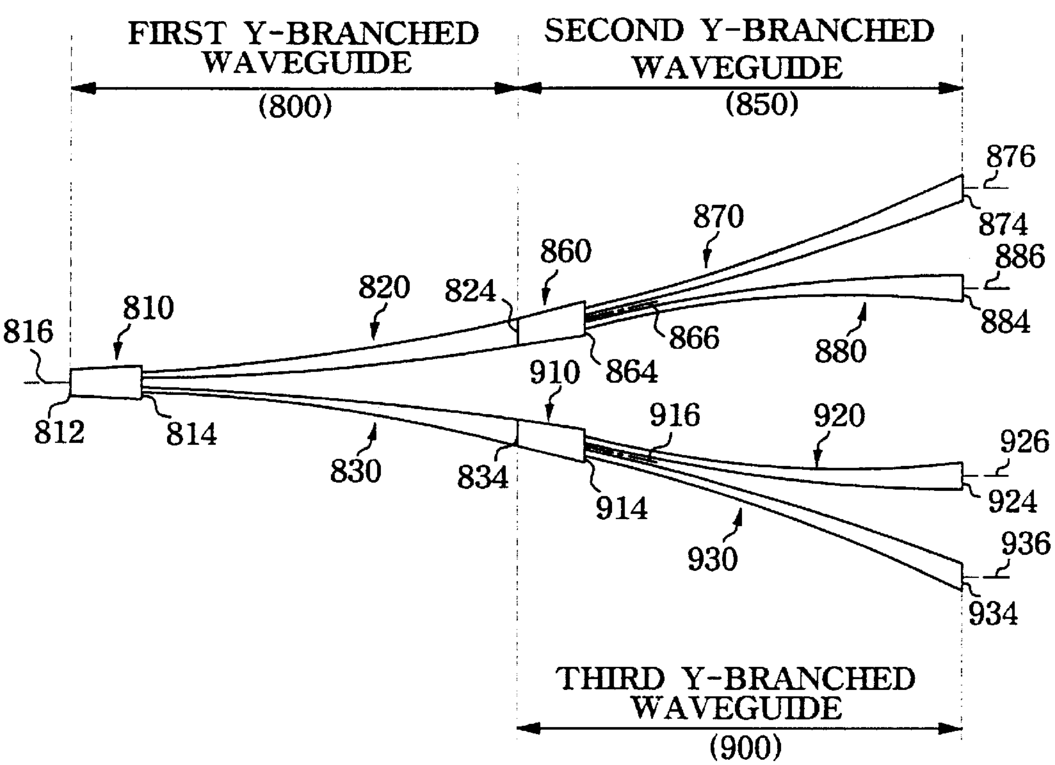
FIG. 18 is a schematic diagram showing the structure of a two-stage optical power splitter having the Y-branched optical waveguide of FIG. 15 according to a preferred embodiment of the present invention.
Figure 19A:
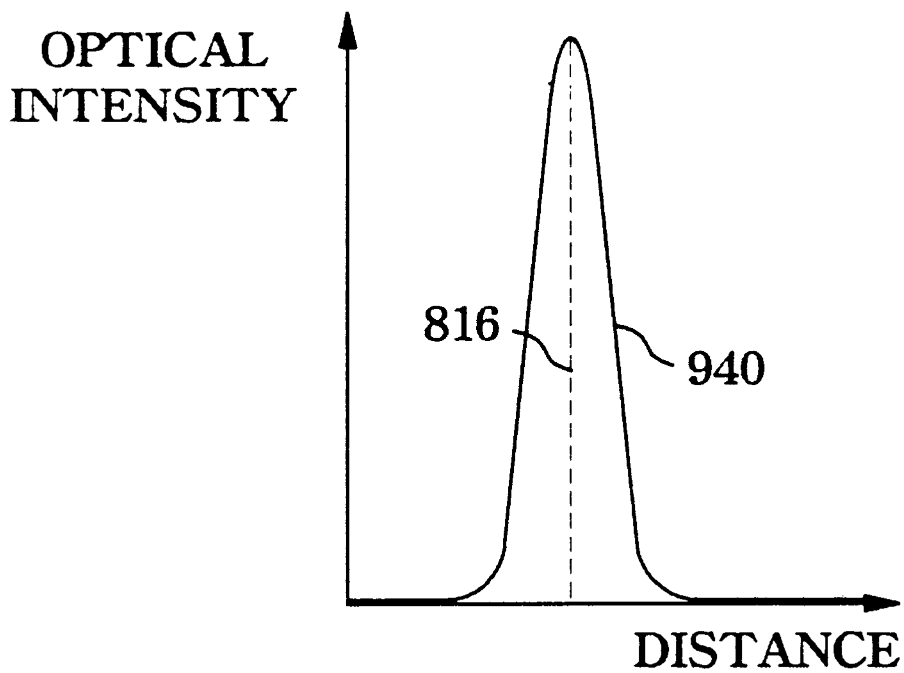
FIGS. 19*a* and 19*b* are graphic diagrams illustrating the mode profiles of the optical signals propagating through the two-stage optical power splitter of FIG. 18.
Figure 19B:
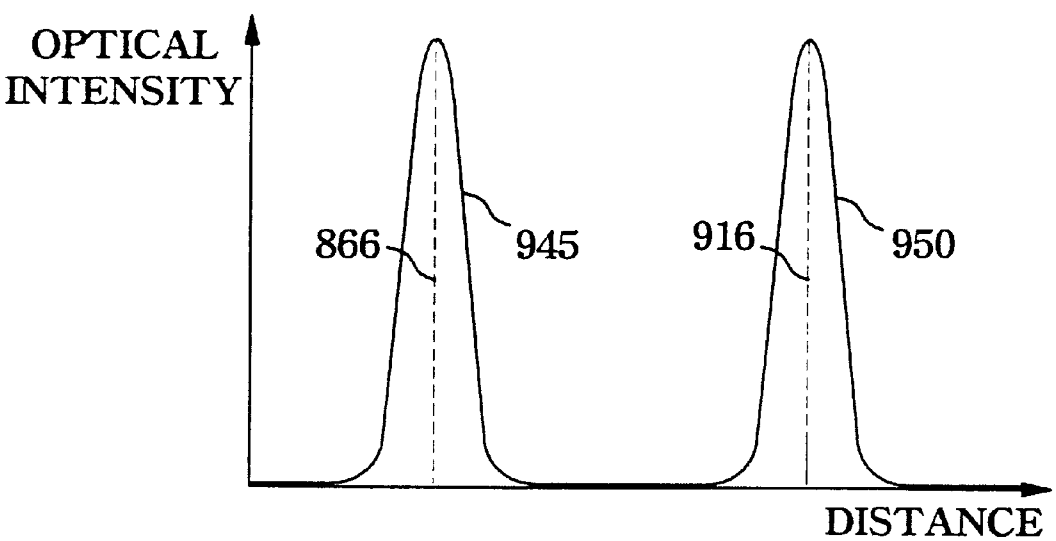

FIG. 18 schematically shows the structure of a two-stage optical power splitter having the Y-branched optical waveguide of FIG. 15 according to another preferred embodiment of the present invention. FIGS. 19*a* and 19*b* each show the mode profiles of the optical signals propagating through the two-stage optical-power splitter according to FIG. 18. This two-stage optical power splitter includes a first Y-branched optical waveguide 800, which constructs a first stage of the two-stage optical power splitter, having a first input-tapered waveguide 810, and a first and a second output-tapered waveguides 820 and 830. The two-stage optical power splitter further includes a second Y-branched optical waveguide 850, which constructs a second stage of the two-stage optical power splitter, having a second input-tapered waveguide 860, and a third and a fourth output-tapered waveguides 870 and 880 respectively, and a third Y-branched optical waveguide 900 having a third input-tapered waveguide 910, and a fifth and a sixth output-tapered waveguides 920 and 930, respectively.

FIG. 19*a* shows the mode profile 940 of the optical signal appearing in the second end section 814 of the first input-tapered waveguide 810. Here, the arrangement is made in such a way that the input optical signal is perpendicularly incident to the first end section 812 of the first input waveguide 810, and thus the center of the mode profile 940 coincides to a first centered line 816 of the first input waveguide.

FIG. 19*b* shows the mode profiles 945 and 950 of the first branched optical signals appearing in the second end section 864 and 914 of the second and third input-tapered waveguides 860 and 910. As illustrated, it is noted that the center lines of the mode profiles 945 and 950 are formed to coincide with the center lines 866 and 916 of the second and third input-tapered waveguide 860 and 910.

Figure 20:
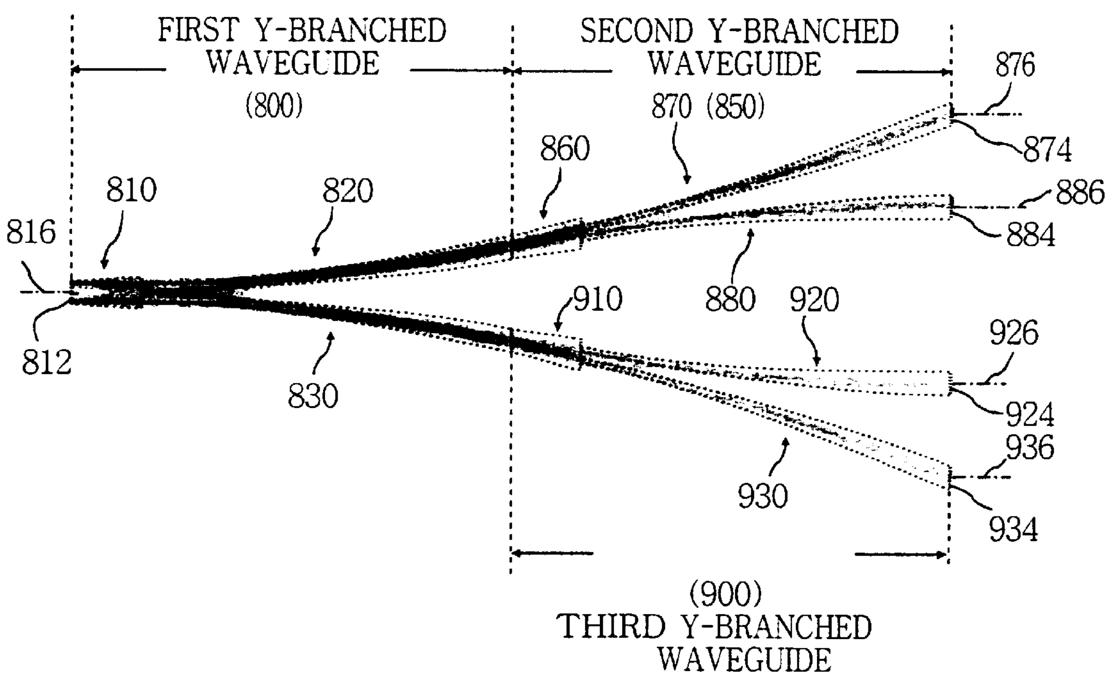
FIG. 20 is a schematic diagram illustrating the waveguiding mode of the optical signals propagating through the two-stage optical power splitter according to FIG. 18; and, FIG. 21 is a graphic diagram illustrating the first to the fourth mode profiles of the second-branched optical signals appearing in the second end sections of the third to the sixth tapered output waveguides.

FIG. 20 schematically illustrates the waveguiding mode of the optical signals propagating through the two-stage optical power splitter according to FIG. 18. As seen in the waveguiding mode of the branched optical signals, it is observed that the first branched optical signals propagate through the first and second output-tapered waveguides 820 and 830 along their longitudinal directions in a relatively stable manner, and the second branched optical signals propagate through the third to the sixth output waveguides 870, 880, 920, and 930 along their longitudinal directions in a relatively unstable manner likewise.

Figure 21:
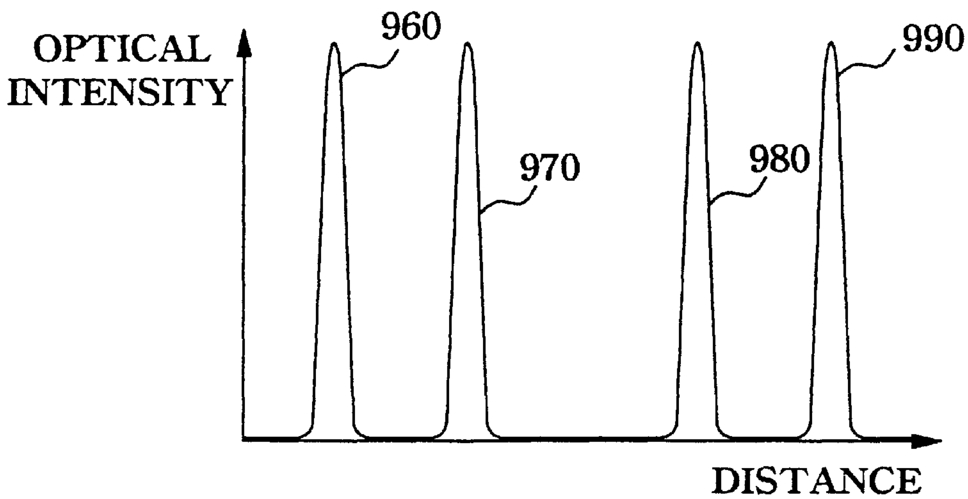

Referring to FIG. 21, there are illustrated the first to the fourth mode profiles 960, 970, 980, and 990 of the second-branched optical signals appearing in the second end sections 874, 884, 924, and 934 of the third to the sixth tapered output waveguides 870, 880, 920, and 930. The illustrated diagram shows that all the center intensities in these first to the fourth mode profiles 960, 970, 980, and 990 are substantially the same to each other.

As apparent from the foregoing description, the Y-branched optical waveguide according to the present invention would secure a more even output characteristic in an optical waveguiding medium by way of disposing the respective entrance of the two, i.e., first and second, output-tapered waveguides on a dismal end section of the input-tapered waveguide, asymmetrically with respect to a centered line of the input-tapered waveguide. Furthermore, it will be appreciated that the multi-stage optical power splitter according to the present invention is particularly advantageous in securing a more even output characteristic by means of connecting a plurality of Y-branched optical waveguides in series or parallel.

While the invention has been shown and described with reference to a certain preferred embodiment thereof, it will be understood by those skilled in the art that various changes or modifications in form and details may be made therein without departing from the spirit and scope of the invention as defined by the appended claims.

What is claimed is:

1. A multi-stage optical power splitter having a plurality of Y-branched optical waveguides arranged in a tree hierarchy with at least one Y-branched optical waveguide at a leave of the tree, each of the Y-branched optical waveguides having a core section serving as a transmission medium of an optical signal and a cladding section surrounding the core section, at least one of the Y-branched optical waveguides located other than at a leave of the tree comprising:

an input-tapered waveguide configured to receive the optical signal through a first ending section and to output the optical signal through a second ending section; and, a pair of first and second output-tapered waveguides each configured to receive the optical signal branched through the second ending section, from which said pair of first and second output-tapered waveguides are extending outwardly, said pair of first and second output-tapered waveguides having an asymmetrical structure with respect to a center line of said input-tapered waveguide, wherein the body of said first and second output-tapered waveguides are respectively formed in an arc whose curvature throughout remains convex with respect to the center line.

2. The Y-branched optical waveguide according to claim 1, wherein the input of said pairs of first and second output-tapered waveguides are arranged at said second ending section of said input-tapered waveguide, so that the respective inner edge of said pairs of first and second output-tapered waveguides are spaced apart from each other by a first predetermined gap.

3. The Y-branched optical waveguide according to claim 2, wherein the input of said pairs of first and second output-tapered waveguides are arranged at said second ending section of said input-tapered waveguide, so that the respective outer edges of said pairs of first and second output-tapered waveguides are spaced apart from each other by a second predetermined gap.

4. The Y-branched optical waveguide according to claim 3, wherein the arc has a specified curvature.

5. The Y-branched optical waveguide according to claim 2, wherein the arc has a specified curvature.

6. The Y-branched optical waveguide according to claim 1, wherein the arc has a specified curvature.

7. The Y-branched optical waveguide according to claim 1, wherein said input-tapered waveguide includes a symmetrical structure with respect to the centered line of said input-tapered waveguide.

8. The Y-branched optical waveguide according to claim 1, wherein a distance of each of the waveguides of said pair of first and second output-tapered waveguides to the center line gradually widens with distance along the center line away from said second ending section.

9. The power splitter of claim 1, wherein the power splitter is configured so that, in cross-section, said second ending section has two opposite corners and so that said first and second output-tapered waveguides each has a respective lateral outer edge that meets said second ending section, a distance between one of the outer edges where said one meets said second ending section and a respective one of said corners differing from a distance between the other of the outer edges where said other meets said second ending section and the other of said corners.

10. A multi-stage optical power splitter having a plurality of Y-branched optical waveguides arranged in a tree hierarchy with at least one Y-branched optical waveguide at a leave of the tree, each of the Y-branched optical waveguides having a core section serving as a transmission medium of an optical signal and a cladding section surrounding the core section, at least one of said plurality of Y-branched optical waveguides located other than at a leave of the tree comprising:

an input-tapered waveguide configured to receive the optical signal through a first ending section and to output the optical signal through a second ending section, said input-tapered waveguide having a symmetrical structure with respect to a centered line of said input-tapered waveguide; and, a pair of first and second output-tapered waveguides each configured to receive the optical signal branched through the second ending section, from which said pair of first and second output-tapered waveguides are extending outwardly, said pair of first and second output-tapered waveguides having an asymmetrical structure with respect to the center line of said input-tapered waveguide, wherein a distance of each of the waveguides of said pair of first and second output-tapered waveguides to the center line gradually and continuously widens with distance along the center line away from said second ending section.

11. The Y-branched optical waveguide according to claim 10, wherein the inputs of said pairs of first and second output-tapered waveguides are arranged at said second ending section of said input-tapered waveguide, so that the respective inner edge of said pairs of first and second output-tapered waveguides are spaced apart from each other by a first predetermined gap.

12. The Y-branched optical waveguide according to claim 11, wherein the body of said first and second output-tapered waveguides are respectively formed in an arc with a specified curvature.

13. The Y-branched optical waveguide according to claim 10, wherein the inputs of said pairs of first and second output-tapered waveguides are arranged at said second ending section of said input-tapered waveguide, so that the respective outer edges of said pairs of first and second output-tapered waveguides are spaced apart from each other by a second predetermined gap.

14. The Y-branched optical waveguide according to claim 13, wherein the body of said first and second output-tapered waveguides are respectively formed in an arc with a specified curvature.

15. The Y-branched optical waveguide according to claim 10, wherein the body of said first and second output-tapered waveguides are respectively formed in an arc with a specified curvature.

16. The Y-branched optical waveguide according to claim 10, wherein the width of each of said pair of first and second output-tapered waveguides narrow as longitudinal approach is made toward said second ending section.

17. The power splitter of claim 10, wherein the power splitter is configured so that, in cross-section, said second ending section has two opposite corners and so that said first and second output-tapered waveguides each has a respective lateral outer edge that meets said second ending section, a distance between one of the outer edges where said one meets said second ending section and a respective one of said corners differing from a distance between the other of the outer edges where said other meets said second ending section and the other of said corners.

* * * * *